United States Patent
Hayashi et al.

(10) Patent No.: US 9,114,630 B1
(45) Date of Patent: Aug. 25, 2015

(54) PRINTING CONTROL APPARATUS AND PRINTING CONTROL METHOD

(71) Applicant: SEIKO EPSON CORPORATION, Tokyo (JP)

(72) Inventors: Takuma Hayashi, Nagano (JP); Tomonaga Hasegawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/631,504

(22) Filed: Feb. 25, 2015

(30) Foreign Application Priority Data

Mar. 19, 2014 (JP) .................................. 2014-056103

(51) Int. Cl.
  B41J 29/393 (2006.01)
  B41J 2/21 (2006.01)

(52) U.S. Cl.
  CPC .................................... B41J 2/2121 (2013.01)

(58) Field of Classification Search
  CPC .. G06K 15/107; B41J 2/2132; B41J 2/04505; B41J 2/5058; H04N 1/4055
  USPC .................................... 347/14, 15, 19, 41, 43
  See application file for complete search history.

(56) References Cited

U.S. PATENT DOCUMENTS 7,499,198 B2   3/2009   Hirano
7,733,533 B2 *  6/2010  Stanich et al. ............... 358/3.13

FOREIGN PATENT DOCUMENTS

JP       2004-015674 A       1/2004

\* cited by examiner

*Primary Examiner* — Thinh Nguyen
(74) *Attorney, Agent, or Firm* — Global IP Counselors, LLP

(57) ABSTRACT

A printing control apparatus includes a dither halftone component configured to convert printing data into a multi-value dot pattern. A reference pattern is a pattern that includes a first dot row in which two or more dots are arranged side by side in a main scanning direction and a second dot or second dot row that is arranged side by side in the main scanning direction, the second dot or second dot row having a number of dots not greater than a number of dots of the first dot row including a dot adjacent in an oblique direction with respect to the main scanning direction to a predetermined dot included in the first dot row. The dither halftone component carries out halftoning by using a mask pattern with which a probability that the reference pattern occurs in a dot pattern that is generated is substantially high.

12 Claims, 13 Drawing Sheets

← DIRECTION OF RELATIVE MOVEMENT
OF RECORDING HEAD

| Duty/255 | 32 | 64 | 128 |
|---|---|---|---|
| Second Mask Pattern | 0 | 11 | 42 |
| Third Mask Pattern | 0 | 21 | 77 |

Fig. 11

PRINTING CONTROL APPARATUS AND PRINTING CONTROL METHOD

CROSS-REFERENCE TO RELATED APPLICATIONS

This application claims priority to Japanese Patent Application No. 2014-056103 filed on Mar. 19, 2014. The entire disclosure of Japanese Patent Application No. 2014-056103 is hereby incorporated herein by reference.

BACKGROUND

1. Technical Field

The present invention relates to a printing control apparatus and printing control method for carrying out dither halftone processing.

2. Related Art

In recent years, it has come to be known that a disturbance called wind rippling occurs when minute ink droplets are discharged at high density. Wind rippling is thought to arise when an air flow that is produced when a carriage provided with a recording head moves and an air flow that is produced when the ink droplets are discharged from nozzles cause a path of discharge of the ink droplets to become distorted.

The idea of arranging obliquely when deciding on the positions of arrangements of dots as a mask pattern to be used in dither halftone processing has also been known, in turn; one that is known is disclosed in JP-A-2004-15674 (patent document 1).

SUMMARY

In a printing apparatus disclosed in patent document 1, the sensitivity of human visual perception becomes more dulled and conspicuousness is lessened when an oblique 45° or 135° angle is used as a line screen angle as compared to when the vertical or horizontal direction is used as a reference for the arrangement of dots.

However, in a case where such an oblique arrangement employs a staggered arrangement, which is the most common, then it is unavoidable to note that the resulting pattern is very prone to produce wind rippling. It is believed that having the staggered arrangement blocks off the escape routes for the air flows.

The present invention provides a printing control apparatus and printing control method for printing by using a dither mask pattern with which the occurrence of wind rippling can be proactively prevented.

The present invention is a printing control apparatus for printing by using a recording head on which a plurality of nozzles are arranged in a row and causing ink droplets to be discharged from each of the nozzles. The printing control apparatus includes a dither halftone component configured to convert printing data into a multi-value dot pattern by using a mask pattern for converting multi-gradation printing data into multi-value data representative of presence or absence of a dot, where a reference pattern is a pattern that includes a first dot row in which two or more dots are arranged side by side in a main scanning direction, which is a direction in which the recording head scans in a relative fashion with respect to a printing medium, and a second dot or second dot row that is arranged side by side in the main scanning direction, the second dot or second dot row having a number of dots not greater than a number of dots of the first dot row including a dot adjacent in an oblique direction with respect to the main scanning direction to a predetermined dot included in the first dot row, the second dot or second dot row being adjacent in a state of having been offset in the main scanning direction from the first dot row in a case where the number of dots is the same as the number of dots in the first dot row, wherein the dither halftone component carries out halftoning by using a first mask pattern with which a probability that a reference pattern occurs in a dot pattern that is generated is greater than a probability that the reference pattern occurs in a dot pattern that is generated on the basis of a mask pattern of a blue noise characteristic in a case where the ink duty is 25%.

In the aforementioned configuration, the printing control apparatus uses a recording head on which a plurality of nozzles are arranged in a row, and causes ink droplets to be discharged from each of the nozzles. Prior thereto, the dither halftone component converts printing data into a multi-value dot pattern by using a mask pattern for converting multi-gradation printing data into multi-value data representative of the presence or absence of a dot. The first mask pattern used in the present invention has the following arrangement.

The reference pattern is a pattern that includes a first dot row in which two or more dots are arranged side by side in a main scanning direction, which is the direction in which the recording head scans in a relative fashion with respect to a printing medium, and a second dot or second dot row arranged side by side in the main scanning direction, the second dot or second dot row having a number of dots not greater than the number of dots of the first dot row including a dot adjacent in an oblique direction with respect to the main scanning direction to a predetermined dot included in the first dot row, wherein, in a case where the number of dots is the same as the number of dots in the first dot row, then the second dot or second dot row is adjacent in a state of having been offset in the main scanning direction from the first dot row. The case of the first mask pattern has properties such that the probability that a reference pattern will occur in a dot pattern that is generated is greater than the probability that the reference pattern will occur in a mask pattern that is generated on the basis of a blue noise characteristic, in a case where the ink duty is 25%.

When the recording head moves in the main scanning direction, a state is enacted where air flows flow in at an orientation opposite to the main scanning direction. As such, with respect to the mask pattern, the air flows flow in at the opposite orientation. As regards the reference pattern, likewise, when the dots are arranged so as to be obliquely side by side with the leading side, as stated above, then the air flows flow in parallel with the two or more dots arranged side by side in the main scanning direction in front, and thereafter the presence of the dot arranged obliquely side by side causes the air flows to be induced in the direction thereof. Making it easier for the air flows to be induced eliminates excessive disturbance to the ink droplets being discharged, and also causes wind rippling to be less likely to occur.

In one mode of the present invention, the first mask pattern is configured such that, where the oblique direction is a direction of induction of air flow in the reference pattern, the direction of induction is aligned when the reference pattern is arranged in the dot pattern that is generated.

Aligning the direction of induction in the mask pattern as a whole causes the air flows to be induced in the same direction. The flow is smooth when induction is in the same direction, and therefore excessive disturbance of the ink droplets that are discharged is eliminated and wind rippling is also less likely to occur.

In one mode of the present invention, the first mask pattern is configured such that, where a region is bisected in a secondary scanning direction, the direction of induction is oriented upward in a region above and the direction of induction is oriented downward in a region below.

When the recording head is moving in the main scanning direction, the air flow will be induced upward and downward (from the inside to the outside) with respect to the nozzle row, and therefore the air flows can be induced smoothly, excessive disturbance of the ink droplets being discharged is eliminated, and wind rippling is less likely to occur.

In one mode of the present invention, the first mask pattern is configured such that with which an orientation of the reference pattern is formed so as to correspond to a relative direction between the recording head and the printing medium.

The shape of the reference pattern has the ability to obliquely induce air flows in two directions, with reference to the main scanning direction. However, the ability to induce air flows could also be said to be higher with orientation in the main scanning direction than with the direction of the opposite side. For this reason, forming two so as to correspond to the relative direction between the recording head and the printing medium and changing each so as to match the direction of movement makes it possible to better and more easily achieve the induction ability.

In one mode of the present invention, the first mask pattern is configured such that dots of the reference pattern account for 75% or more of dots in the dot pattern that is generated. One measure would be the measure of the number of reference patterns for the present invention to achieve the effects.

In one mode of the present invention, the dither halftone component includes the first mask pattern and a second mask pattern having high dispersibility, uses the first mask pattern in a case where a printing medium that is resistant to bleeding is used during band printing, a distance between the recording head and the printing medium is wide, and an interval between the nozzles is narrow, and otherwise uses the second mask pattern.

The first mask pattern is used as a countermeasure for a case where wind rippling is likely to occur. In turn, the mask patterns used in the dither halftone process are created from different perspectives, such as the perspective of dispersibility and the perspective of graininess. In a case where a printing medium that is resistant to bleeding is used during band printing, there is a wide distance between the recording head and the printing medium, and the interval between the nozzles is narrow, wind rippling is more likely to occur and therefore the first mask pattern is used, but in cases not relevant thereto, i.e., cases where it cannot be said that wind rippling is likely to occur, then the second mask pattern, which was created with the perspective of dispersibility, is used, and so doing makes it possible to carry out halftone processing having high dispersibility.

The present invention is a printing control apparatus for printing by using a recording head on which a plurality of nozzles are arranged in a row and causing ink droplets to be discharged from each of the nozzles. The printing control apparatus includes a dither halftone component configured to convert printing data into a multi-value dot pattern by using a mask pattern for converting multi-gradation printing data into multi-value data representative of presence or absence of a dot, where a reference pattern is a pattern that includes a first dot row in which two or more dots are arranged side by side in a main scanning direction, which is a direction in which the recording head scans in a relative fashion with respect to a printing medium, and a second dot or second dot row that is arranged side by side in the main scanning direction, the second dot or second dot row having a number of dots not greater than a number of dots of the first dot row including a dot adjacent in an oblique direction with respect to the main scanning direction to a predetermined dot included in the first dot row, the second dot or second dot row being adjacent in a state of having been offset in the main scanning direction from the first dot row in a case where the number of dots is the same as the number of dots in the first dot row, wherein the dither halftone component carries out halftoning by using a first mask pattern in a case a first mode for printing a first printing medium is used, and carries out halftoning by using a second mask pattern in a case a second mode for printing a second printing medium which is less resistant to bleeding than the first printing medium is used, wherein a probability that the reference pattern occurs in a dot pattern that is generated on the basis of the first mask pattern is greater than a probability that the reference pattern occurs in a dot pattern that is generated on the basis of the second mask pattern in a case where the ink duty is 25%.

In another mode of the present invention, the first mask pattern is configured such that, where the oblique direction is a direction of induction of air flow in the reference pattern, the direction of induction is aligned when the reference pattern is arranged in the dot pattern that is generated.

In another mode of the present invention, the first mask pattern is configured such that, where a region is bisected in a secondary scanning direction, the direction of induction is oriented upward in a region above and the direction of induction is oriented downward in a region below.

In another mode of the present invention, the first mask pattern is configured such that an orientation of the reference pattern is formed so as to correspond to a relative direction between the recording head and the printing medium.

In another mode of the present invention, the first mask pattern is configured such that dots of the reference pattern account for 75% or more of dots in the dot pattern that is generated.

The technical concept as in the present invention is in no way intended to be realized solely with the mode of a printing control apparatus; other conceivable examples include the invention of a printing control method having a processing step executed by the aforementioned printing control apparatus, or the invention of a program for causing hardware (a computer) to execute a process that is implemented in the aforementioned printing control apparatus. The printing control apparatus may be implemented by a single apparatus, or may be implemented as a system composed of a plurality of apparatuses, or may be incorporated into a given product (for example, a printing apparatus).

According to the present invention, a reference pattern appears in abundance in a dot pattern that is printed, i.e., dots are arranged obliquely and this causes dots to be less likely to be adjacent in a nozzle row direction, and causes air flows to flow more easily between nozzles during printing. This rectifies the air flow between nozzles and causes wind rippling to be less likely to occur.

BRIEF DESCRIPTION OF THE DRAWINGS

Referring now to the attached drawings which form a part of this original

DISCLOSURE

Figure 1:
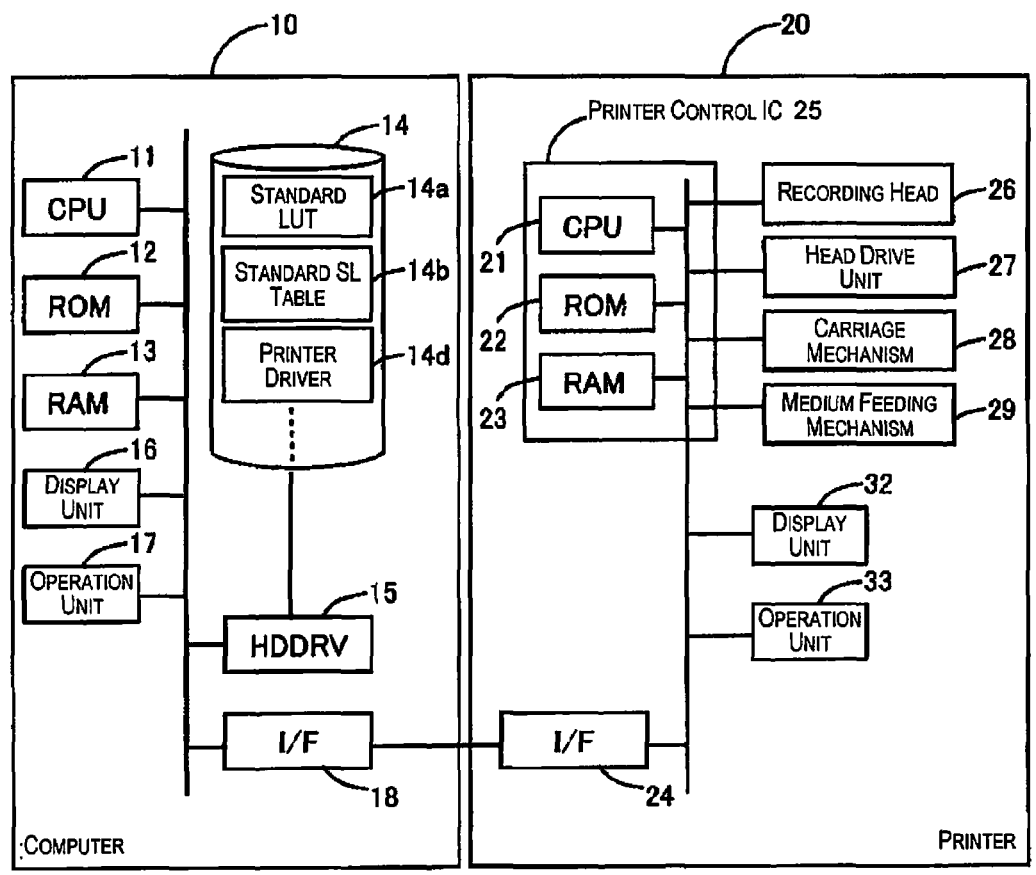
Figure 2:
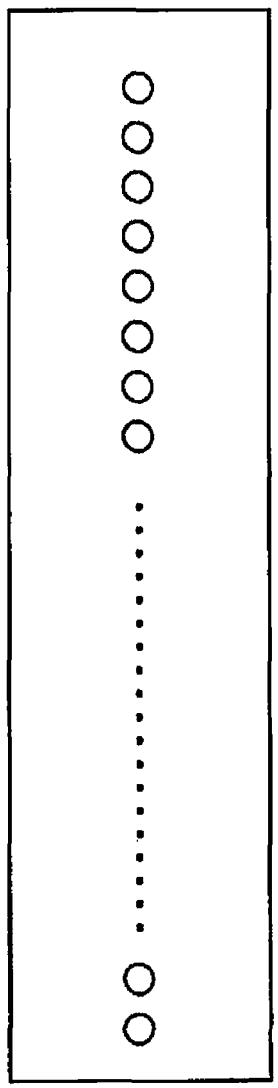
Figure 3:
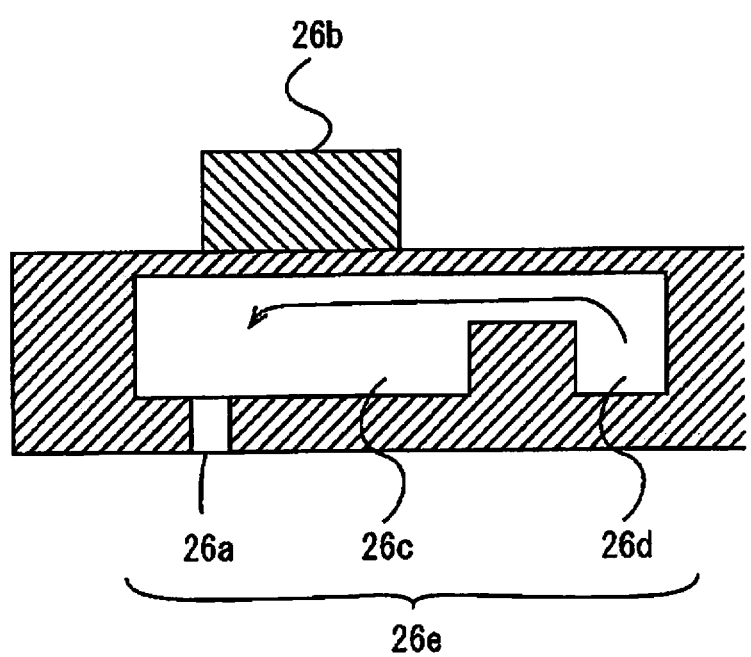
Figure 4:
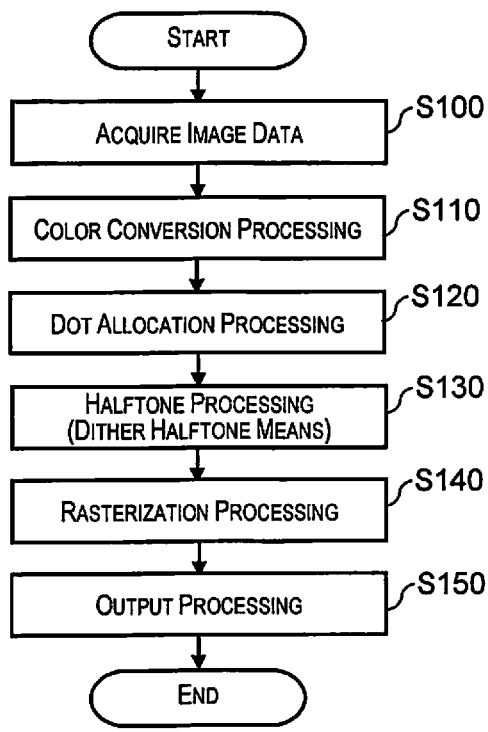
Figure 5A:
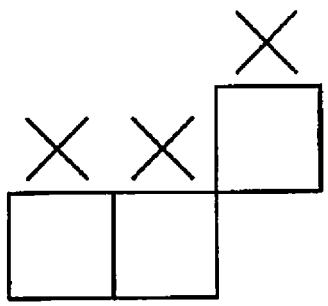
Figure 5B:
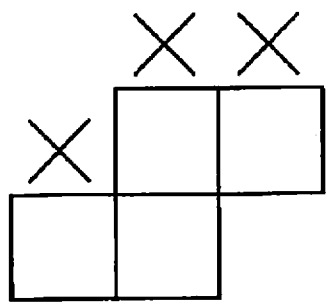
Figure 5C:
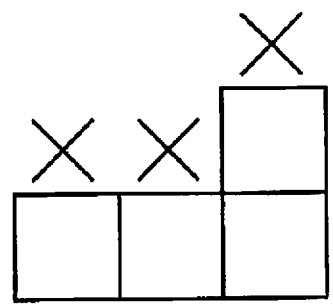
Figure 6:
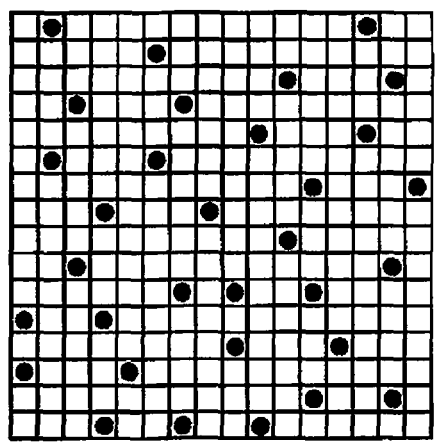
Figure 6:
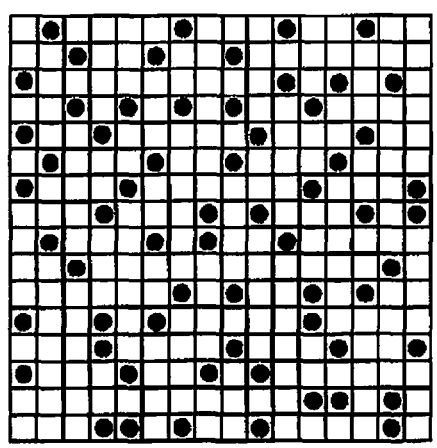
Figure 6:
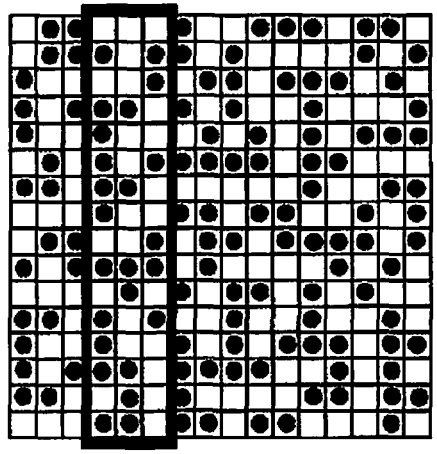
Figure 7:
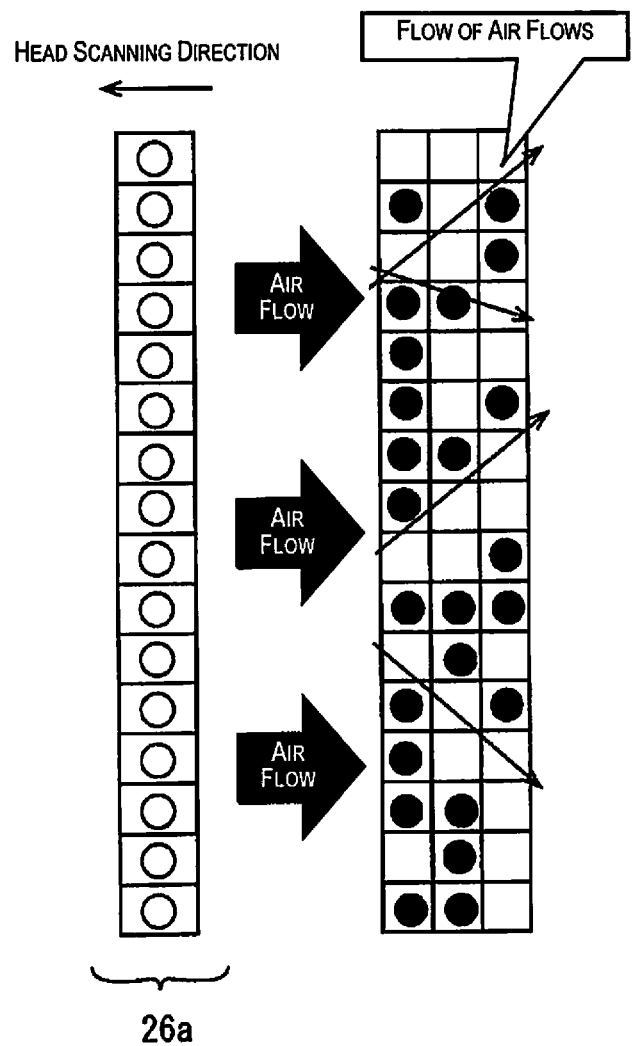
Figure 8:
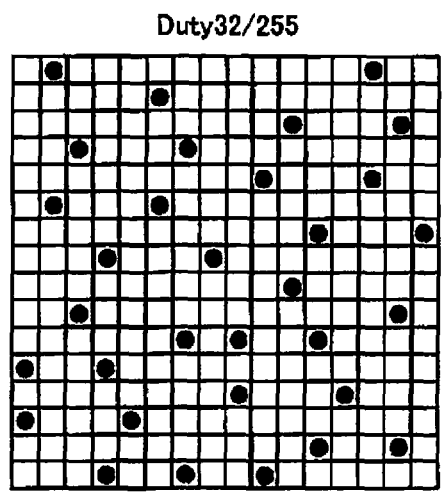
Figure 8:
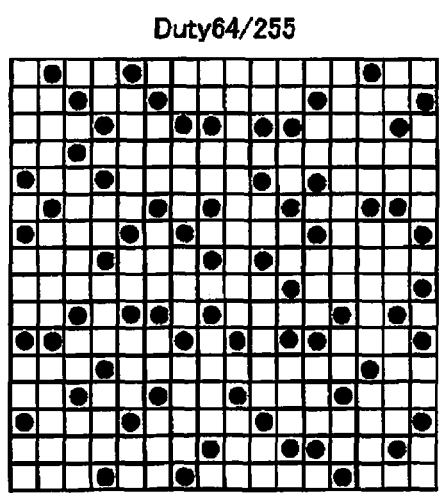
Figure 8:
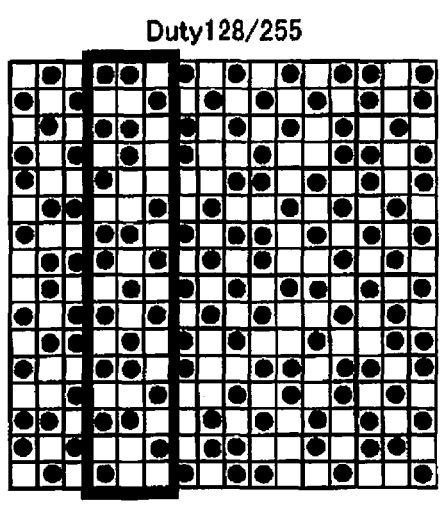
Figure 9:
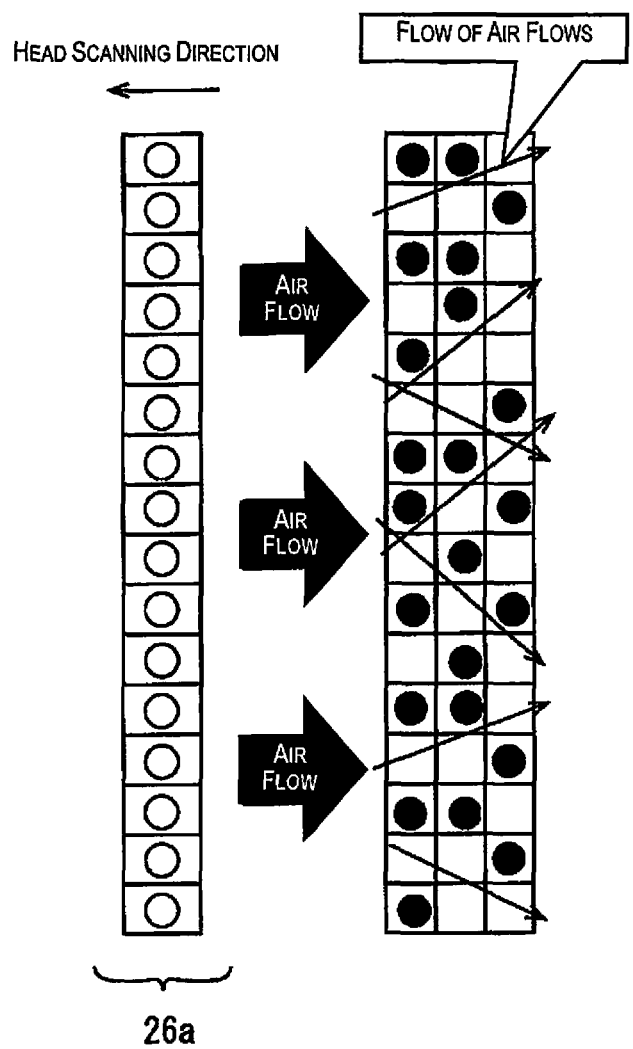
Figure 10:
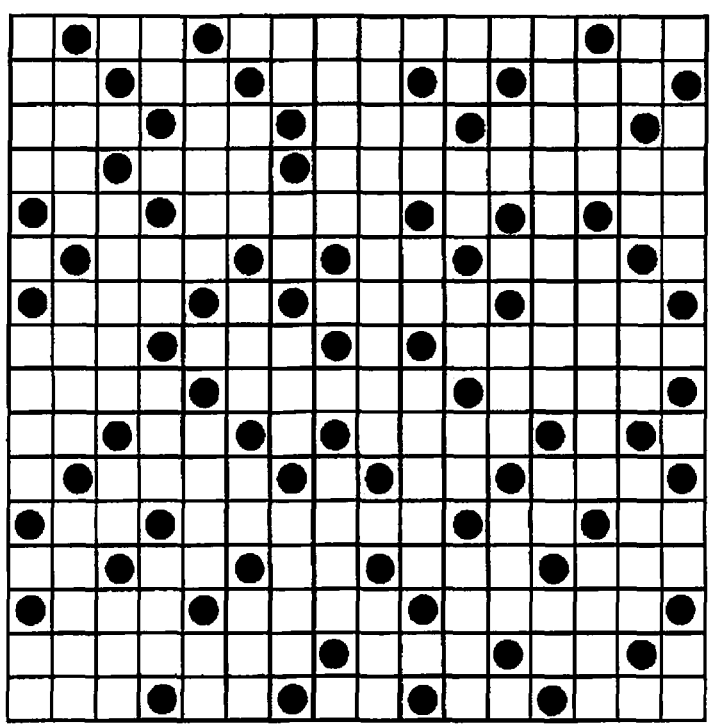
Figure 12:
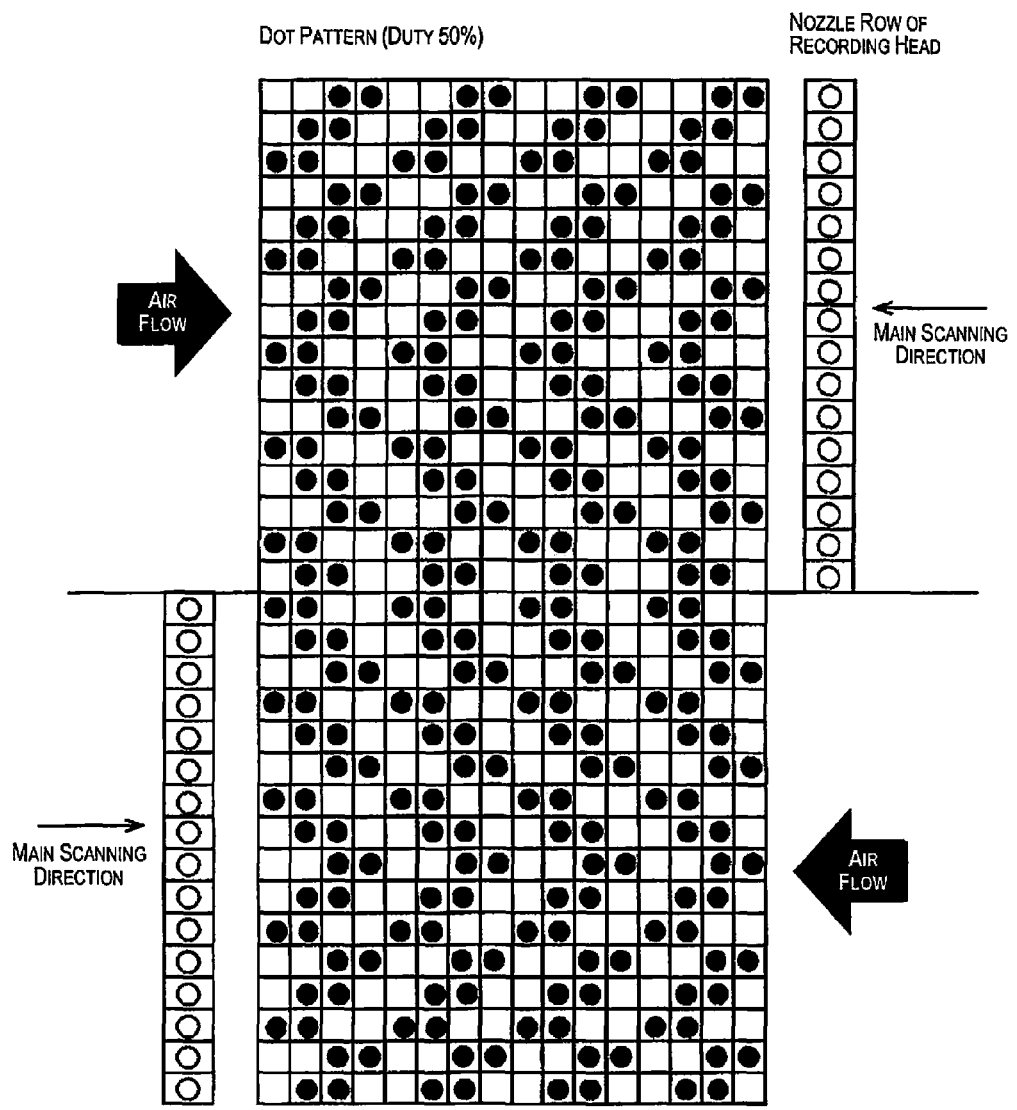
Figure 13:
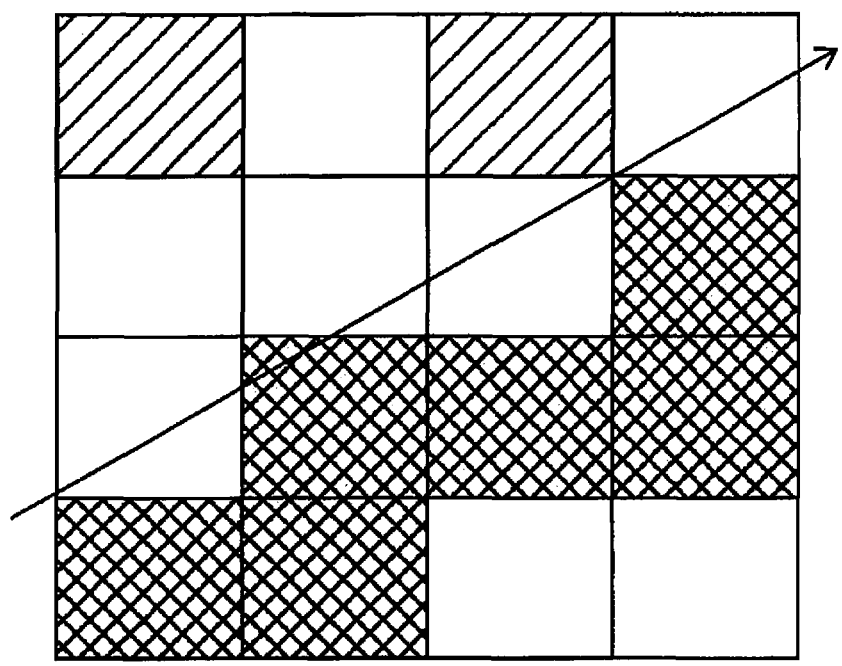

FIG. 1 is a block diagram illustrating a printing system to which the printing control apparatus of the present invention has been applied;

FIG. 2 is a bottom view illustrating a row of nozzles formed on a recording head;

FIG. 3 is a partial cross-sectional view of a recording head illustrating a printing flow path and a nozzle;

FIG. 4 is a flow chart illustrating a printing control implemented by a printing control apparatus;

FIGS. 5A, 5B and 5C are drawings illustrating the arrangement of dots of a reference pattern;

FIG. 6 is a drawing illustrating dot patterns that are formed by a second mask pattern that is generated on the basis of a blue noise characteristic;

FIG. 7 is a drawing illustrating the flow of an air flow at the time of printing when a second mask pattern is used;

FIG. 8 is a drawing illustrating dot patterns that are formed by a first mask pattern of the present invention;

FIG. 9 is a drawing illustrating the flow of an air flow at the time of printing when a first mask pattern is used;

FIG. 10 is a drawing illustrating dot patterns that are formed by a third mask pattern as in a modification example;

FIG. 11 is a drawing illustrating a comparison of a third mask pattern and a second mask pattern;

FIG. 12 is a drawing illustrating a correspondence between a mask pattern and a scanning direction; and FIG. 13 is a drawing illustrating a dot pattern formed by a first mask pattern.

DETAILED DESCRIPTION OF EMBODIMENTS

An embodiment of the present invention shall be described below, with reference to the accompanying drawings.

(1) Description of an Overview of the Apparatus Configuration

FIG. 1 is a block diagram illustrating a printing control apparatus as in one embodiment of the present invention.

The present system has, for example, a computer 10 and a printer 20. The computer 10 and/or the printer 20 correspond to an example of the printing control apparatus of the present invention. The printing control apparatus is the agent of execution of a printing control method. In the computer 10, a CPU 11 constituting the center of computational processing controls the computer 10 as a whole via a system bus. Connected to this bus are a ROM 12, a RAM 13, and a variety of interfaces (an I/F 18 and the like); also connected is a hard disk (HD) 14 serving as a storage means via a hard disk drive (HDDRV) 15. The HD 14 stores an operating system, an application program, a printer driver 14d, and the like; these are read out to the RAM 13 and executed as appropriate by the CPU 11.

The HD 14 moreover stores a standard look-up table (LUT) 14a serving as a color conversion LUT which associates color information in a predetermined output color system with a plurality of lattice points in a predetermined input color system, a standard SL table 14b serving as a dot allocation table for converting gradation data representative of an amount of ink into gradation data representative of a formation amount of a plurality of different types of dots that each have a different ink amount, and the like. The printer driver 14d shall be described below, as shall these LUTs and tables. The computer 10 is also provided with: a display unit 16 constituted of, for example, a liquid crystal display; an operation unit 17 constituted of, for example, a keyboard, a mouse, a touch pad, or a touch panel; and the like.

The printer 10 is one example of a printing apparatus that is controlled by the computer 10. It shall be readily understood that the printer 20 is one that is capable of realizing print processing using a local function, without relying on the control of the computer 10. In the printer 20, an I/F 24 has a wired or wireless connection to the I/F 18 on the computer 10 side, and a printer control IC 25 or the like is connected via the system bus. In the printer control IC 25, the CPU 21 reads software (firmware) that is stored in the ROM 22 or the like out to the RAM 23 as appropriate and executes a predetermined control. The printer control IC 25 is an integrated circuit (IC) mainly for executing a control for print processing, and connects to each of the parts of a recording head 26, a head drive unit 27, a carriage mechanism 28, and a medium feeding mechanism 29 and controls each of the parts. The recording head shall be described below.

The carriage mechanism 28 is controlled by the printer control IC 25, and is a drive apparatus for reciprocatingly moving a carriage (not shown) along a guide rail (not shown) provided to the printer 20. The recording head 26 is mounted onto the carriage, and the recording head 26 moves reciprocatingly (main scanning) along the guide rail along with the discharging of dots. The medium feeding mechanism 29 is controlled by the printer control IC 25 and, in response thereto, uses a roller (not shown) or the like to convey a printing medium in a direction of conveyance. The printer 20 is also provided with: a display unit 32 constituted of, for example, a liquid crystal display; and an operation unit 33 constituted of, for example, a button, a touch panel, or the like. A line head-type model may also be employed as the printer 20.

(2) Description of the Recording Head

The recording head 26 receives the supply of a variety of inks from an ink cartridge for every variety of ink (for example, cyan (C) ink, magenta (M) ink, yellow (Y) ink, black (K) ink, light cyan (Lc) ink, and light magenta (Lm) ink, and forms an image on the printing medium by ejecting (discharging) ink droplets (dots) from a plurality of nozzles provided so as to correspond to the variety of inks. Applied voltage data corresponding to raster data representing an image intended to be printed is outputted to the head drive unit 27 by the printer control IC 25. From the applied voltage data, the head drive unit 27 generates and outputs an applied voltage pattern (drive waveform) applied to piezoelectric elements that are formed so as to correspond to each of the nozzles of the recording head 26, thus causing each of the nozzles of the recording head 26 to discharge dots for every type of ink.

FIG. 2 is a bottom view illustrating a row of nozzles formed on the recording head, and FIG. 3 is a partial cross-sectional view of the recording head illustrating a printing flow path and an actuator.

A large number of nozzles 26a are formed with an arrangement at regular intervals (pitch) in one row on the bottom surface of the recording head 26. The nozzles 26a need not be in a single row and may be in two rows, and need not be in a rectilinear form but rather may be in a staggered form. In the recording head 26, an actuator 26b is disposed for every one of the nozzles 26a. In addition to the nozzle 26a, which serves as a discharge port, a reservoir 26d communicating with an ink cartridge (not shown) is also provided in a pressure chamber 26c having a predetermined volume. The route going from the ink cartridge to the nozzle 26a constitutes an ink flow path 26e. The actuator 26b is formed of a piezoelectric element; the receipt of the applied voltage pattern, which is applied on an individual basis for each of the actuators 26b, changes the volume of the pressure chamber 26c and causes an ink droplet to be discharged.

(3) Description of the Reference Pattern

FIGS. 5A, 5B and 5C are drawings illustrating the arrangement of dots of a reference pattern. A "reference pattern" refers to a pattern that is composed of: a first dot row in which two or more dots are arranged side by side in a main scanning direction, which is the direction in which the recording head 26 scans in a relative fashion with respect to the printing medium; and a second dot or second dot row arranged side by side in the main scanning direction, the second dot or second dot row being composed of a number of dots not greater than the number of dots of the first dot row, including a dot adjacent in an oblique direction with respect to the main scanning direction to a predetermined dot included in the first dot row, wherein, in a case where the number of dots is the same as the number of dots in the first dot row, then the second dot or second dot row is adjacent in a state of having been offset in the main scanning direction from the first dot row. Hereinbelow, for the sake of ease, the term "pattern" shall also be applied where two or more dots are arranged side by side in the main scanning direction and a dot is arranged so as to be arranged obliquely side by side on the leading side as seen from the main scanning direction. FIG. 5A illustrates two dots that are arranged side by side in the main scanning direction and one dot that is arranged obliquely side by side on the leading side. Prepared as a derivative example on the basis thereof are two sets each of two dots arranged side by side in the main scanning direction, as shown in FIG. 5B, the two sets being arranged in pixel rows that are adjacent in a secondary scanning direction and formed with an offset amounting to one dot in the main scanning direction. There are also three dots arranged side by side in the main scanning direction and, at the same time, one dot arranged at a pixel position that is adjacent in the secondary scanning direction to the leading-side dot, as shown in FIG. 5C. FIGS. 5A to 5C all comprise the pattern shown in FIG. 5A, and are endowed with an air flow induction effect. For this reason, FIGS. 5A to 5C are all included as "reference patterns". It shall be readily understood that patterns that have been inverted on the basis of the main scanning direction are also included. Fundamentally, the term "reference pattern" is applied to when dots are not applied to pixel positions (illustrated with an X in the drawing) that are adjacent in the secondary scanning direction, except for these dots.

(4) Description of the Printing Control

FIG. 4 is a flow chart illustrating the printing control implemented by the printing control apparatus.

In step S100, image data selected by the user as being intended for printing and the like are acquired by the CPU 11, which reads same out from a predetermined storage area such as the HD 14. By operating the operation unit 17 while also viewing a predetermined UI screen displayed on the display unit 16, the user is able to optionally select the image data intended to be printed. The CPU 11 can also subject the image data to a resolution conversion process, an image quality correction process, or the like as appropriate.

In step S110, the CPU 11 consults a color conversion LUT and runs the image intended to be printed through a color conversion. As a result of this, printing data (image data) having a CMYKLcLm ink amount set for every pixel is generated. In step S120, the CPU 11 consults a dot allocation table and converts each of the ink amounts (gradation values) constituting the ink amount set for every pixel of the image data into a large- or small-dot formation amount (gradation value).

In step S130, the CPU 11 executes a so-called halftone process, the target of which is the printing data having undergone the dot allocation process. In the halftone process, the multi-gradation printing data is converted to multi-value data representative of the presence or absence of a dot. Being "multi-gradation" refers to multi-gradation values that are employed in printing data and the like, such as 256 gradations. Multi-gradation gradation values are represented, for example, with integer values of 256 gradations from 0 to 255.

In turn, multi-value data is data representative of the circumstances of formation of a dot, and may be binary data representative of the presence or absence of a dot, or multi-value data of three or more gradations able to address dots of different sizes, such as small, medium, and large dots. The binary data can be, for example, data where 1 corresponds to dot formation and 0 corresponds to no dot. One possible example of quaternary data is data where 3 corresponds to large dot formation, 2 corresponds to medium dot formation, 1 corresponds to small dot formation, and 0 corresponds to no dot. In this manner, being multi-value is not limited to being binary, but rather corresponds to physically reproducible dot sizes, and signifies binary, tertiary, quaternary, or the like, but being multi-value depends on the hardware performance and is not intended to be limited to these. In the halftone process, dithering employing a mask pattern described in greater detail below is used; dot pattern data (halftone data) stipulating non-discharge of a dot, small dot discharge, or large dot discharge is generated for every pixel constituting the pixel data as well as for every type of ink. This process of step S130 constitutes a dither halftone means.

In step S140, the CPU 11 subjects the halftone data to a predetermined rasterization process, and generates raster data for every type of ink, in which the data has been rearranged in the order in which the recording head 26 discharges the ink. In step S150, the CPU 11 outputs a print command, which includes the raster data, to the printer 20 via the I/F 18.

(5) Mask Pattern and Flow of Air Flow

FIG. 6 is a drawing illustrating dot patterns that are formed by a second mask pattern that is generated on the basis of a blue noise characteristic. What is illustrated are cases where there are respectively different ink duties (ink densities) in the printing of a solid pattern; in the cases illustrated, the ink duty is 32/255, 64/255, and 128/255, from the top.

FIG. 7 is a drawing illustrating the flow of the air flow at the time of printing when the second mask pattern is used. There is an enlarged illustration amounting to three pixel rows in the main scanning direction in the case where the ink duty is 128/255.

In FIG. 7, the recording head 26 on which the row of nozzles 26a is arranged moves in main scanning from right to left over the drawing. Then, the air flow flows in a relative fashion from left to right. As a result of this, in the course of the formation of a given dot pattern, it could be said that the air flow flows from a trailing side to a leading side, with respect to the mask pattern.

The second mask pattern illustrated in FIG. 6 is one that makes use of a blue noise characteristic to enhance dispersibility, so as to be less likely to be of concern in human vision. However, FIG. 7 illustrates escape routes of the air flow with arrows, but often the air flow will be blocked off as regards elsewhere besides these arrows.

FIG. 8 is a drawing illustrating dot patterns that are formed by a first mask pattern of the present invention.

Where a dot pattern with which the ink duty is 64/255 is taken by way of example, the dot pattern illustrated in FIG. 8 includes reference patterns in seven places. The dot pattern produced by the second mask pattern in the case where the ink duty is likewise 64/255 (FIG. 6) does not include even one pattern that can be said to be a reference pattern.

FIG. 9 is a drawing illustrating the flow of air flow at the time of printing when the first mask pattern is used. Similarly to FIG. 7, FIG. 9 provides an enlarged illustration amounting to three pixel rows in the main scanning direction in a case where the ink duty is 128/255.

Compared to the dot pattern based on the second mask pattern illustrated in FIG. 7, more arrows are written onto the dot pattern based on the first mask pattern illustrated in FIG. 9, and it shall be understood that the flow of the air flows is not blocked off but rather is induced.

Patterns that could be said to be reference patterns are included in four places in the dot pattern illustrated in FIG. 9; by contrast, the one illustrated in FIG. 7 only includes a reference pattern in one place.

From these examples, as well, an effect can be understood with which including many reference patterns makes it possible to allow air flows to flow smoothly.

First Modification Example

FIG. 10 is a drawing illustrating a dot pattern that is formed by a third mask pattern as in a modification example. The dot pattern is from when a solid pattern that has an ink duty of 64/255 is printed.

In this modification example, no reference pattern is included, but a mask pattern is formed in consideration of the following.

Obliquely arranging the dots by using a dither mask allows the air flows to flow more easily between the nozzles and suppresses wind rippling.

More specifically,

1: The proportion at which dots are formed obliquely adjacent to one another is modified in accordance with the amount of ink that strikes.

2: From the vicinity of where the ink duty is 64/255, the proportion at which the dots are formed obliquely adjacent to one another is increased.

3: This is carried out in circumstances where wind rippling is more likely to occur.

FIG. 11 is a drawing illustrating a comparison of the third mask pattern and the second mask pattern. The illustration contrasts the number of places where dots are arranged obliquely in cases where the ink duty is 32/255, 64/255, or 128/255 in each of the mask patterns. In cases where the ink duty is 64/255 or 128/255, it will be readily understood that cases where the third mask pattern is used have about double the number of places where dots are arranged obliquely. In this manner, deliberately manipulating the mask pattern has made it possible to increase the places where dots are arranged obliquely, so as to be more numerous than a case where a mask pattern that is generated on the basis of a blue noise characteristic is used. It shall be readily understood that in a region where the ink duty is relatively low, the flow of air flows is favorable.

In this example, the recording head length and the vertical size of the dither mask pattern are the same.

The configuration causes the dots that are generated obliquely to increase so as to be more numerous than with a conventional dither mask pattern, from the vicinity of where the ink duty is 64/255, which is where wind rippling begins to be conspicuous.

Obliquely arranging the dots causes the dots to be less likely to adjacent to one another in the nozzle row direction, and therefore makes it easier for the air flow to flow between the nozzles during printing. This rectifies the air flow between nozzles and causes wind rippling to be less likely to occur.

In this manner, in a region where the ink duty is low, even without necessarily using a reference pattern, such a mask pattern as to increase the number of dots that occur obliquely still rectifies the air flow between the nozzles and causes the wind rippling to be less likely to occur.

In light of the above, a mask pattern such as is illustrated in FIG. 10 may be used in a case where the ink duty is 25%, thus increasing the probability of the reference pattern occurring in a region where the ink duty thus generated is increased.

Second Modification Example

FIG. 12 is a drawing illustrating the correspondence between the mask pattern and the main scanning direction. FIG. 12 illustrates an example where the mask pattern is reversed so as to correspond to the direction of movement of the recording head 26.

The direction in which the air flow is induced is determined by the reference patterns. Namely, for two or more pixel rows arranged side by side in the main scanning direction, it is thought that the air flow is induced toward the direction of the pixel positions of dots that are arranged obliquely side by side. Then, when the reference patterns are arranged in the dot pattern being generated, the direction of induction is aligned. In the case of this mask pattern, a region is divided into an above and below at substantially the middle with reference to the secondary scanning direction; in the region above, the direction of induction is aligned oriented upward and the air flow is induced upward, and in the region below, the direction of induction is aligned oriented downward and the air flow is induced downward. So doing causes the air flow to be induced from the inside to the outside, and therefore causes there to be very little disturbance of the air flow.

Without any other alteration in a case where the direction of induction is aligned in this manner, however, the direction of induction is reversed when the direction of movement of recording head is reversed, thus causing the air flow to be induced toward the inside from the outside. In such a case, the air flows going toward the inside will face one another, and the air flows could very well experience disturbance.

For this reason, as illustrated in FIG. 12, in a case where the main scanning direction moves from left to right, then the mask pattern is one where the dot pattern is formed as illustrated in the upper section, and in a case where the main scanning direction moves in reverse from right to left, then the mask pattern is one where the dot pattern is formed as illustrated in the lower section. In other words, the orientation of the mask pattern is modified in accordance with the direction of movement of the recording head, and therefore it can be said that the orientation of the mask pattern is formed in accordance with the relative direction between the recording head and the printing medium. Because the reference patterns can still be said to have directionality in a case where the direction of induction has not been aligned in this manner, the orientation of the reference patterns may also be formed so as to correspond to the relative direction between the recording head and the printing medium.

Third Modification Example

The example above described the probability that the reference pattern will be generated as being greater than the probability in a case where a mask pattern generated on the basis of a blue noise characteristic is used. The description of this third modification example shall describe a more specific example.

It could be said that the probability of the reference pattern occurring is greater than the probability in a case where a mask pattern generated on the basis of a blue noise characteristic is used provided that, as one reference, the dots of the reference pattern account for 75% or more from among the dots in the dot pattern generated using the first mask pattern.

FIG. 13 is a drawing illustrating one example of a dot pattern that is formed by the first mask pattern.

One conceivable example is a 4×4 square. In this case, there are 16 pixel positions, and eight dots will be applied when the ink duty is 50%. The circumstances are such that six of these dots form the reference pattern. When six dots out of eight dots form the reference pattern, it can be said that these dots account for 75% or more.

The dot pattern illustrated in FIG. 13 includes the reference pattern shown in FIG. 5B and the reference pattern shown in FIG. 5C, with overlap. The two reference patterns are formed with a total of six dots. As such, where the dots are included at this probability, it can be said that the probability is greater than the probability of a case where a mask pattern generated on the basis of a blue noise characteristic is used.

Fourth Modification Example

The first mask pattern described above is favorable as a wind rippling countermeasure. However, the second mask pattern such as is illustrated in FIG. 7 was created with the perspective of dispersibility, and therefore generally yields a favorable halftone result. For this reason, it is preferable to use the first mask pattern in circumstances where wind rippling is believed to be more likely to occur, e.g., during band printing, when a printing medium less likely to have bleeding is used, when there is a wide distance between the recording head and the printing medium, and when there is a narrow interval between the nozzles. It is otherwise preferable to use the second mask pattern.

The resistance to bleeding of the printing medium can be acquired via a UI screen at which the user designates the printing medium, and either the distance between the recording head and the printing medium is fixed by the model type, or can be acquired so as to correspond to the selection of the printing medium. The interval between the nozzles is fixed by the model type, and therefore the determination can be made for every model type. The dither halftone means comprehensively makes these decisions and decides whether or not to use the first mask pattern.

In the working example described above, the printer 20 was employed, of a type where the recording head 26 moves in the width direction of the printing medium. However, wind rippling can sometimes occur also in so-called line printers, of a type where the recording head is fixed, and the present invention can also be applied to line printers.

The present invention is in no way intended to be limited to the above working examples. It shall be readily understood by a person skilled in the art that:
  the act of applying appropriately modified combinations of mutually substitutable members, configurations, and the like that are disclosed in the working examples above;
  the act of applying appropriate substitutions of members, configurations, and the like which were not disclosed in the working examples above but are well-known technologies and are mutually substitutable with the members, configurations, and the like that were disclosed in the working examples above, and applying modified combinations thereof; and
  the act of appropriately substituting with members, configurations, and the like which were not disclosed in the working examples above but of which a person skilled in the art could conceive as substitutes for the members, configurations, and the like that were disclosed in the working examples above, on the basis of well-known technologies or the like are intended to be disclosed as working examples of the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. A printing control apparatus for printing by using a recording head on which a plurality of nozzles are arranged in a row and causing ink droplets to be discharged from each of the nozzles, the printing control apparatus comprising:
  a dither halftone component configured to convert printing data into a multi-value dot pattern by using a mask pattern for converting multi-gradation printing data into multi-value data representative of presence or absence of a dot,
  where a reference pattern is a pattern that includes a first dot row in which two or more dots are arranged side by side in a main scanning direction, which is a direction in which the recording head scans in a relative fashion with respect to a printing medium, and a second dot or second dot row that is arranged side by side in the main scanning direction, the second dot or second dot row having a number of dots not greater than a number of dots of the first dot row including a dot adjacent in an oblique direction with respect to the main scanning direction to a predetermined dot included in the first dot row, the second dot or second dot row being adjacent in a state of having been offset in the main scanning direction from the first dot row in a case where the number of dots is the same as the number of dots in the first dot row,
  wherein the dither halftone component carries out halftoning by using a first mask pattern with which a probability that the reference pattern occurs in a dot pattern that is generated is greater than a probability that the reference pattern occurs in a dot pattern that is generated on the basis of a mask pattern of a blue noise characteristic in a case where the ink duty is 25%.

2. The printing control apparatus as set forth in claim 1, wherein
  the first mask pattern is configured such that, where the oblique direction is a direction of induction of air flow in the reference pattern, the direction of induction is aligned when the reference pattern is arranged in the dot pattern that is generated.

3. The printing control apparatus as set forth in claim 1, wherein the first mask pattern is configured such that, where a region is bisected in a secondary scanning direction, the direction of induction is oriented upward in a region above and the direction of induction is oriented downward in a region below.

4. The printing control apparatus as set forth in claim 3, wherein the first mask pattern is configured such that an orientation of the reference pattern is formed so as to correspond to a relative direction between the recording head and the printing medium.

5. The printing control apparatus as set forth in claim 1, wherein the first mask pattern is configured such that dots of the reference pattern account for 75% or more of dots in the dot pattern that is generated.

6. The printing control apparatus as set forth claim 1, wherein the dither halftone component includes the first mask pattern and a second mask pattern having high dispersibility, uses the first mask pattern in a case where a printing medium that is resistant to bleeding is used during band printing, a distance between the recording head and the printing medium is wide, and an interval between the nozzles is narrow, and otherwise uses the second mask pattern.

7. A printing control method for printing by using a recording head on which a plurality of nozzles are arranged in a row and causing ink droplets to be discharged from each of the nozzles, the printing control method comprising:

when a dither halftone is implemented that converts printing data into a multi-value dot pattern by using a mask pattern for converting multi-gradation printing data into multi-value data representative of presence or absence of a dot, where a reference pattern is a pattern that includes a first dot row in which two or more dots are arranged side by side in a main scanning direction, which is a direction in which the recording head scans in a relative fashion with respect to a printing medium, and a second dot or second dot row that is arranged side by side in the main scanning direction, the second dot or second dot row having a number of dots not greater than a number of dots of the first dot row including a dot adjacent in an oblique direction with respect to the main scanning direction to a predetermined dot included in the first dot row, the second dot or second dot row being adjacent in a state of having been offset in the main scanning direction from the first dot row in a case where the number of dots is the same as the number of dots in the first dot row, carrying out halftoning by using a first mask pattern with which a probability that the reference pattern occurs in a dot pattern that is generated is greater than a probability that the reference pattern occurs in a dot pattern that is generated on the basis of a mask pattern of a blue noise characteristic in a case where the ink duty is 25%.

8. A printing control apparatus for printing by using a recording head on which a plurality of nozzles are arranged in a row and causing ink droplets to be discharged from each of the nozzles, the printing control apparatus comprising:

a dither halftone component configured to convert printing data into a multi-value dot pattern by using a mask pattern for converting multi-gradation printing data into multi-value data representative of presence or absence of a dot, where a reference pattern is a pattern that includes a first dot row in which two or more dots are arranged side by side in a main scanning direction, which is a direction in which the recording head scans in a relative fashion with respect to a printing medium, and a second dot or second dot row that is arranged side by side in the main scanning direction, the second dot or second dot row having a number of dots not greater than a number of dots of the first dot row including a dot adjacent in an oblique direction with respect to the main scanning direction to a predetermined dot included in the first dot row, the second dot or second dot row being adjacent in a state of having been offset in the main scanning direction from the first dot row in a case where the number of dots is the same as the number of dots in the first dot row, wherein the dither halftone component carries out halftoning by using a first mask pattern in a case a first mode for printing a first printing medium is used, and carries out halftoning by using a second mask pattern in a case a second mode for printing a second printing medium which is less resistant to bleeding than the first printing medium is used, wherein a probability that the reference pattern occurs in a dot pattern that is generated on the basis of the first mask pattern is greater than a probability that the reference pattern occurs in a dot pattern that is generated on the basis of the second mask pattern in a case where the ink duty is 25%.

9. The printing control apparatus as set forth in claim 8, wherein the first mask pattern is configured such that, where the oblique direction is a direction of induction of air flow in the reference pattern, the direction of induction is aligned when the reference pattern is arranged in the dot pattern that is generated.

10. The printing control apparatus as set forth in claim 8, wherein the first mask pattern is configured such that, where a region is bisected in a secondary scanning direction, the direction of induction is oriented upward in a region above and the direction of induction is oriented downward in a region below.

11. The printing control apparatus as set forth in claim 10, wherein the first mask pattern is configured such that an orientation of the reference pattern is formed so as to correspond to a relative direction between the recording head and the printing medium.

12. The printing control apparatus as set forth in claim 8, wherein the first mask pattern is configured such that dots of the reference pattern account for 75% or more of dots in the dot pattern that is generated.

* * * * *